US012733086B2

(12) United States Patent
Schmücker et al.

(10) Patent No.: US 12,733,086 B2
(45) Date of Patent: Sep. 8, 2026

(54) CONTROLLING X-RAY TUBE ELECTRON BEAM OPTICS DURING KVP SWITCHING

(71) Applicant: KONINKLIJKE PHILIPS N.V., Eindhoven (NL)

(72) Inventors: Helmut Gerhard Schmücker, Hamburg (DE); Timothy Striker, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 19/140,130

(22) PCT Filed: Dec. 13, 2023

(86) PCT No.: PCT/EP2023/085491
§ 371 (c)(1),
(2) Date: Jun. 17, 2025

(87) PCT Pub. No.: WO2024/132742
PCT Pub. Date: Jun. 27, 2024

(65) Prior Publication Data

US 2026/0046993 A1 Feb. 12, 2026

(30) Foreign Application Priority Data

Dec. 22, 2022 (EP) .................................... 22215748

(51) Int. Cl.
*H05G 1/58* (2006.01)
*H05G 1/52* (2006.01)

(52) U.S. Cl.
CPC ................. *H05G 1/58* (2013.01); *H05G 1/52* (2013.01)

(58) Field of Classification Search
CPC .................................. H05G 1/58; H05G 1/52
See application file for complete search history.

(56) References Cited

U.S. PATENT DOCUMENTS

2011/0150187 A1 6/2011 Boudry
2012/0163530 A1 6/2012 Sainath
(Continued)

FOREIGN PATENT DOCUMENTS

EP 3528274 A1 8/2019
JP 2011005018 A 1/2011
(Continued)

OTHER PUBLICATIONS

JP 2008-140654 A and its English translation (Year: 2008).*
PCT International Search Report, International application No. PCT/EP2023/085491, Mar. 12, 2024.

*Primary Examiner* — Chih-Cheng Kao
(74) *Attorney, Agent, or Firm* — Larry Liberchuk

(57) ABSTRACT

The present invention relates to a computer-implemented method of controlling electron beam optics of an X-ray tube during X-ray kVp switching. The method includes receiving (110) a tube voltage (11) and a filament current (12) corresponding to a first time point of an X-ray tube kVp switching cycle; calculating (120) with an X-ray tube emission current model (310), a tube emission current (13) at the first time point, wherein the calculation is based on the tube voltage and the tube filament current; calculating (130) an electron beam focusing current and/or focusing voltage (14) based on the calculated tube emission current (13) and the tube voltage (11); and outputting (140) an electron beam optics control signal (15) based on the calculated electron beam focusing current and/or focusing voltage. The invention also relates to an X-ray imaging system (500) configured to carry out the method.

13 Claims, 5 Drawing Sheets

(56) References Cited

U.S. PATENT DOCUMENTS

| | | | | |
|---|---|---|---|---|
| 2018/0068823 | A1 | 3/2018 | Utschig | |
| 2018/0228011 | A1* | 8/2018 | Hirayama ................ | H05G 1/10 |
| 2021/0007210 | A1* | 1/2021 | Steadman Booker ... | H05G 1/52 |
| 2022/0217831 | A1* | 7/2022 | Daerr ....................... | H05G 1/52 |

FOREIGN PATENT DOCUMENTS

| | | | |
|---|---|---|---|
| JP | 2022015134 | A | 1/2022 |
| WO | WO2020229254 | A1 | 11/2020 |

* cited by examiner

CONTROLLING X-RAY TUBE ELECTRON BEAM OPTICS DURING KVP SWITCHING

FIELD OF THE INVENTION

The invention relates to the field of X-ray, and more specifically to a method of controlling electron beam optics of an X-ray tube during kVp switching, to a computer program element, to a computer readable medium, to an X-ray source controller configured to carry out the method, and to an X-ray system comprising the X-ray source controller.

BACKGROUND OF THE INVENTION

A computed tomography (CT) scanner generally includes an X-ray tube mounted on a rotatable gantry opposite one or more rows of detectors. The X-ray tube rotates around an examination region located between the X-ray tube and the one or more rows of detectors and emits broadband radiation that traverses the examination region. Electrical power is supplied to the X-ray tube with a high voltage generator.

The one or more rows of detectors detect radiation that traverses the examination region and generate projection data indicative thereof. A reconstructor reconstructs the projection data to generate volumetric image data, which can be displayed, filmed, archived, conveyed to another device, etc.

The detector array includes detector pixels that convert detected x-ray photons into electrical signals indicative thereof. For each revolution of the rotating gantry, the detector pixels detect and convert x-ray photons for a plurality of integration periods, each corresponding to a different angular position range. The time duration of an integration period depends on the rotating gantry rotation speed and the number integration periods for each revolution of the scan. With an integrating detector array, at the beginning of each integration period, the integrators for the detector pixels are reset, and then the integrators receive and integrate the electrical signals over the integration period. The integrated signals form the projection data for that integration period.

The X-ray tube typically includes a cathode with a filament and an anode. A filament current is applied to the filament, which heats the filament, causing the filament to expel electrons (thermionic emission), creating a space charge (or cloud a negative charge) a short distance away from the filament. A peak tube voltage (kVp) is applied across the cathode and the anode and causes a beam of the electrons to accelerate from the cathode and impinge the anode. The X-ray tube current, or emission current, represents the number of electrons per second flowing from the cathode to the anode. Electrostatic or magnetic focusing with e.g. grid electrodes or quadrupoles can be applied to control a size of and steer the beam of electrons. An interaction of the electrons with the material of the anode produces heat and radiation, including X-rays, which pass through a tube window, into an examination region, to a detector.

A surface area of the anode that receives the beam of electrons is referred to as a focal spot. The size of the focal spot is one factor that affects the image quality of the volumetric image data. For example, the focal spot size affects the spatial resolution, where a smaller focal spot size results in a greater spatial resolution than a larger focal spot size, e.g., due to less focal spot blur from geometric magnification. The size of the focal spot may depend on the X-ray tube voltage, beam focusing voltage and tube current.

The voxels of the volumetric image data are displayed using gray scale values corresponding to relative radiodensity. The gray scale values reflect the attenuation characteristics of the scanned subject and represent anatomical structures. The detected radiation also includes spectral information as the absorption of a photon by a material of a subject and/or an object is dependent on the energy of the photon traversing the material. Such spectral information provides additional information such as information indicative of the atomic, elemental or material composition of the material. However, the projection data does not reflect the spectral characteristics as the projection data are proportional to the energy fluence integrated over the energy spectrum (e.g., 40 keV to 120 keV), and the volumetric image data will not reflect the energy dependent information.

A CT scanner configured for spectral (multi/dual-energy) imaging leverages the spectral characteristics in the detected radiation to provide further information such as atomic or elemental composition information. In general, a spectral CT scanner is configured to detect different bands of X-ray radiation (instead of just the entire spectrum) and generate projection data for each of the different energy bands (instead of just the entire spectrum). In one instance, this is achieved through so called kVp switching. For example, with a dual-energy configuration, the X-ray tube voltage (i.e. the kVp) may be switched back and forth between two kVp's, such as between a first 80 kVp for odd number data acquisition periods and a second 140 kVp for even number data acquisition periods, or vice versa.

Spectral imaging using fast kVp switching in the high voltage generator may be a promising cost-effective alternative to e.g. spectral imaging with multi-layer energy discriminating scintillator or direct conversion detectors.

Focal spot size deviations during fast kVp switching X-ray tube voltage transitions can negatively affect image quality or can even damage the tube. Therefore, the focal spot is preferably kept stable during such transitions and fast and precise control of electron beam optics is required.

Electron beam optics focusing current/voltages thus needs to be adapted to match the corresponding tube voltage and tube emission current in order to properly control the size of the focal spot. However, during fast kVp switching, the tube voltage and the tube current changes very quickly, on the order of tenths to hundreds of microseconds.

Therefore, during such short kVp switching transition timeframes it may not be possible to accurately measure the tube voltage and current. Furthermore, there may be delays in adapting the electron beam focus, caused by e.g. internal communication paths in the electronics and/or the time needed for applied currents/voltages to achieve a particular beam focus. The latter effect may be particularly pronounced with magnetic beam focusing, which may require more time to drive the focusing coils compared to electrostatic focus grids.

Hence, there is a need for improved focal spot control during kVp switching.

SUMMARY OF THE INVENTION

It is an object of the invention to provide timely electron beam focal spot control during fast X-ray tube kVp switching.

The invention is defined by the independent claims. Advantageous embodiments are defined in the dependent claims.

According to a first aspect of the invention, there is provided a computer-implemented method of controlling electron beam optics of an X-ray tube during X-ray kVp switching. The method comprises:

receiving a tube voltage and a filament current corresponding to a first time point of an X-ray tube kVp switching cycle;

calculating with an X-ray tube emission current model, a tube emission current at the first time point, wherein the calculation is based on the tube voltage and the tube filament current;

calculating an electron beam focusing current and/or focusing voltage based on the calculated tube emission current and the tube voltage; and outputting an electron beam optics control signal based on the calculated electron beam focusing current and/or focusing voltage.

The invention makes it possible to control the electron beam optics, such as magnetic and/or electrostatic electron beam optics that regulate the focal spot position and/or size, during very rapid changes of the tube voltage and tube emission current. With the tube voltage and filament current as known input parameters, the tube emission current and subsequently the suitable electron beam focusing current and/or voltage may be determined such that an electron beam optics signal can be output in a timely manner.

In the context of the presently claimed invention, a kVp switching cycle of an X-ray tube comprises two or more different kVp energy levels. With corresponding measurement intervals (integration periods) at the different kVp energy levels, this may enable X-ray spectral imaging. During a kVp switching cycle the tube voltage is switched between at least a "high" kVp energy level and a "low" kVp energy level, such that the X-ray tube generates at least two different X-ray spectra. As a non-limiting example, the generator and X-ray tube hold the cathode to anode voltage at a "low" voltage of for example 80 kV for a time period, and then ramp the cathode to anode voltage to a "high" voltage of for example 140 kV over a time period, and then hold the cathode to anode voltage at 140 kV for a time period, thereby forming a cycle over which dual energy X-ray are produced and providing for spectral imaging. During fast kVp switching, the cycle times may be on the order of tenths to hundreds of microseconds. Hence, transitions of tube voltage and emission current is very rapid. Transition times between energy levels may be shorter than 300 μs, such as between 30 μs and 300 μs, or even shorter.

In the context of the claimed invention, a computer-implemented method means a method which involves the use of a processor, which may include a computer, a computer network, and/or another programmable apparatus, such as a single and/or multi core processing unit, a graphics processing unit, an accelerated processing unit, a digital signal processor, a field programmable gate array, and/or an application-specific integrated circuit, etc. The method may be carried out involving a single apparatus, such as e.g. a single controller comprising and/or interacting with a processor, or may be carried out by a distributed system with multiple local and/or remote units.

According to an embodiment of the invention, the X-ray tube emission current model comprises a 3-dimensional lookup table that maps an emission current to a pair of a tube voltage and a filament current.

According to an embodiment of the invention, the electron beam optics control signal is synchronized with a tube voltage transition during the X-ray tube kVp switching cycle. During such a tube voltage transition, both the tube voltage and tube emission current may change very rapidly. By synchronizing the beam optics control signal with the transition, the size and/or position of the focal spot can be managed to avoid negative effects on the image quality, avoid tube damage etc. that may result from uncontrolled focal spot variations. Preferably, the focal spot size is kept constant or relatively constant during the transition.

According to an embodiment of the invention, the method further comprises receiving one or multiple X-ray tube characteristics at a second time point, wherein the second time point is earlier than the first time point; and predicting, with a predictive X-ray tube model and based on the X-ray tube characteristics, the tube voltage at the first time point and/or the tube filament current at the first time point, wherein the predicted tube voltage and/or filament current form input to the X-ray tube emission current model. This embodiment may be advantageous because it is possible to determine electron beam optics control in advance, e.g. in order to compensate for signal delays or time needed to adjust focusing currents and/or voltages. This may be of particular importance for magnetic beam focusing, which can require more time to drive the focusing coils compared to electrostatic focus grids.

According to an embodiment of the invention, the X-ray tube characteristics comprises at least one of, at the second time point, a tube emission current, a tube voltage, a tube filament current, a tube capacitance, a high voltage generator capacitance, a high voltage cable capacitance, a tube age, an anode age, a temperature, a rotor speed, and/or a tube acoustic signal.

According to an embodiment of the invention, at least one of the X-ray tube characteristics are measured during a kVp switching cycle. By using a characteristic that is measured during actual kVp switching, the prediction of the tube voltage and/or filament current, and subsequently the emission current, may be improved. The prediction of the tube voltage and/or filament current may comprise a lookup table, such as but not limited to a so called 3-dimensional lookup table that maps an emission current to a pair of a tube voltage and a filament current.

According to an embodiment of the invention, the predictive X-ray tube model is a physical model and/or a digital twin of the X-ray tube. Such an X-ray tube model may form a virtual replica of the X-ray tube and/or e.g. model the capacitances of the output side of the high voltage generator, the high voltage cable and/or the tube itself. By way of example, the model may allow to compute e.g. the tube voltage slope based on input such as the energy provided by the high voltage generator.

According to an embodiment of the invention, the predictive X-ray tube model predicts a tube voltage waveform comprising the first time point. If the tube voltage and subsequent emission current waveforms during kVp switching are predicted by the modeling, it may be possible to timely compute the focusing currents or voltage waveform that minimizes size and position deviations of the focal spot during kVp switching.

According to an embodiment of the invention, a tube emission current waveform comprising the first time point is calculated with the emission current model 310.

According to a second aspect of the invention, there is provided a computer program element, which, when being executed by an X-ray source controller, is configured to cause the X-source controller to perform the method. The X-ray source controller executing the computer program element is configured to carry out, and thus capable of carrying out, the computer-implemented method according to the first aspect of the invention. The computer program element may be software available for download from a server, e.g., via the internet.

According to another aspect of the invention, there is provided a computer readable medium having stored thereon the computer program element mentioned above, e.g. a (non-transitory) computer readable medium on which instructions are stored, such as an optical storage medium or a solid-state medium, which may or may not be supplied together with or as part of other hardware.

According to a third aspect of the invention, there is provided an X-ray source controller for controlling electron beam optics of an X-ray tube, wherein the X-ray source controller is configured to carry out the computer-implemented method according to the first aspect of the invention. The X-ray source controller may be comprised in an X-ray source assembly comprising an X-ray tube and a high voltage generator. The X-ray source controller may fully or partly be integrated with a high voltage generator or an X-ray tube. The X-ray source controller may fully or partly be integrated with another part of an X-ray system, such as with a system controller. The X-ray source controller may be a separate functional unit in direct or indirect connection with an X-ray high voltage generator and an X-ray tube.

According to a fourth aspect of the invention, there is provided X-ray system comprising:

an X-ray tube comprising an anode and a cathode; electron beam optics configured to control a focal spot size and/or focal spot position of an electron beam impacting the anode of the X-ray tube; a high voltage generator configured to apply a kVp switching cycle of at least two different voltages between the anode and the cathode of the X-ray tube; the X-ray source controller according to the third aspect of the invention and configured to output the electron beam optics control signal; and a power supply configured to receive the electron beam optics control signal from the X-ray source controller and apply the calculated electron beam focusing current and/or focusing voltage to the electron beam optics to control the focal spot size and/or focal spot position.

According to an embodiment of the invention, the electron beam optics comprises magnetic beam focusing optics configured to control the focal spot size and/or position with at least one magnetic focusing coil.

According to an embodiment of the invention, the system is a computed tomography system. The invention may be particularly advantageous for spectral computed tomography with fast kVp switching.

These and other aspects of the invention will be apparent from and elucidated with reference to the embodiments described hereinafter.

DESCRIPTION OF EMBODIMENTS

Figure 1:
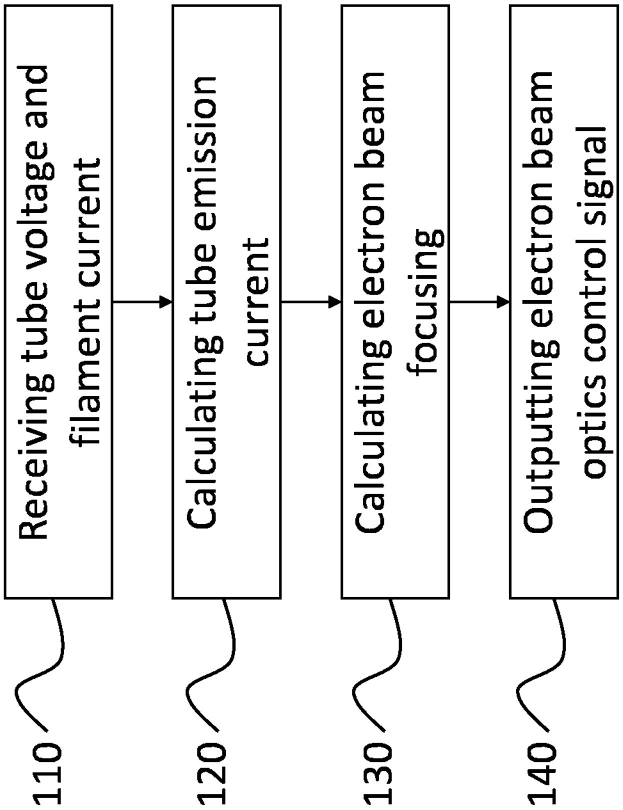
FIG. 1 schematically illustrates an exemplary method of controlling electron beam optics of an X-ray tube during X-ray kVp switching, according to embodiments of the invention.

A method according to embodiments of the invention is illustrated in FIG. 1. The method aims to determine an X-ray tube emission current at a certain moment in time during a kVp switching cycle, such as e.g. at a time point during a rapid transition from high to low peak voltage or from low to high peak voltage during such a switching cycle. The time point may thus be a point in time when at least one of the tube voltage, filament current and/or emission current is in rapid transition. Alternatively, the time point may be at a time during a kVp switching cycle when all the three parameters are (temporarily) stable. The latter may occur during part of a kVp switching plateau. By knowing the emission current and the tube voltage at the specific time point, which may be a present or a future time point, electron beam optics can be timely controlled and adapted to the voltage and current.

In a first step 110, a tube voltage 11 and a filament current 12 corresponding to the specific time point of the kVp switching cycle are received. A tube emission current 13 is calculated 120 with an X-ray tube emission current model 310, based on the tube voltage 11 and the filament current 12. As a non-limiting example, the X-ray tube emission current model 310 may comprise a lookup table to match pairs of tube voltages and filament currents to emission currents. When the emission current 13 has been calculated, the tube voltage 11, filament current 12 and emission current 13 corresponding to the specific time point are known. In the following step 130, an electron beam focusing current and/or focusing voltage (depending on the type of beam optics used) 14 is calculated. Finally, an electron beam optics control signal 15 is output 140, based on the calculated electron beam focusing current and/or focusing voltage 14.

In this way, it may be possible to in a very timely manner control electron beam optics, such as magnetic and/or electrostatic electron beam optics that regulate the focal spot position and/or size, during very rapid changes of the tube voltage and tube emission current, such as during kVp switching. When the specific time point is chosen during a rapid tube voltage transition during the X-ray tube kVp switching cycle, the electron beam optics control signal 15 may thus be synchronized with the voltage transition. During such a tube voltage transition, both the tube voltage and tube emission current may change very rapidly. By synchronizing the beam optics control signal 15 with the transition, the size and/or position of the focal spot can be managed to avoid negative effects on the image quality, avoid tube damage etc. that may result from uncontrolled focal spot variations. Preferably, the focal spot size is kept constant or relatively constant during such a transition.

Figure 2:
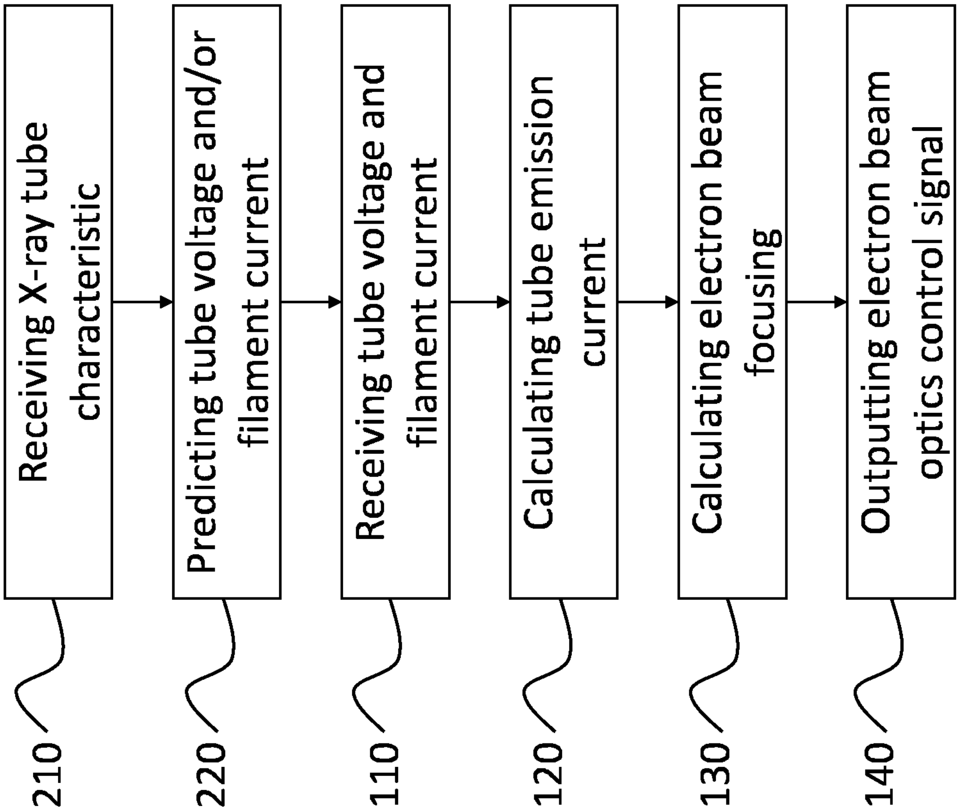
FIG. 2 schematically illustrates another exemplary method of controlling electron beam optics of an X-ray tube during X-ray kVp switching, according to embodiments of the invention.

FIG. 2 illustrates the method as described above with additional steps, according to embodiments of the invention. In this example, the method comprises receiving 210 one or multiple X-ray tube characteristics 21 at an earlier time point. I.e. in advance of the time point for which the emission current 13 is calculated 120 and for which the electron beam optics control signal 15 is output 140. Based on the X-ray tube characteristic or characteristics, an upcoming tube voltage 11 and/or an upcoming tube filament current 12 may be predicted 220 with a predictive X-ray tube model 410.

Examples of X-ray tube characteristics may include a tube emission current, a tube voltage, a tube filament current, a tube capacitance, a high voltage generator capacitance, a high voltage cable capacitance, a tube age, an anode age, a temperature, a rotor speed, and/or a tube acoustic signal etc. The characteristic may be measured, e.g. in real-time, during a kVp switching cycle, or may be otherwise known or modeled. The prediction of the tube voltage 11 and/or filament current 12 may include the use of a lookup table, such as but not limited to a 3-dimensional lookup table that maps emission currents to pairs of a tube voltage and a filament current. Alternatively or additionally, the predictive X-ray tube model 410 may be a physical model and/or a digital twin of the X-ray tube. Such an X-ray tube model may e.g. model the capacitances of the output side of the high voltage generator, the high voltage cable and/or the tube itself. The model may allow to compute e.g. the tube voltage slope based on input such as the energy provided by the high voltage generator.

In a following step, as illustrated by FIG. 2, the predicted tube voltage 11 and/or filament current 12 may subsequently be used as input 110 to the X-ray tube emission current model 310 in order to calculate 120 a tube emission current 13 at the relevant (future) time point. In this way, it may be possible to determine electron beam optics control in advance, e.g. in order to compensate for signal delays or time needed to adjust focusing currents and/or voltages. This may be of particular importance for magnetic beam focusing, which can require more time to drive the focusing coils compared to electrostatic focus grids.

Figure 3:
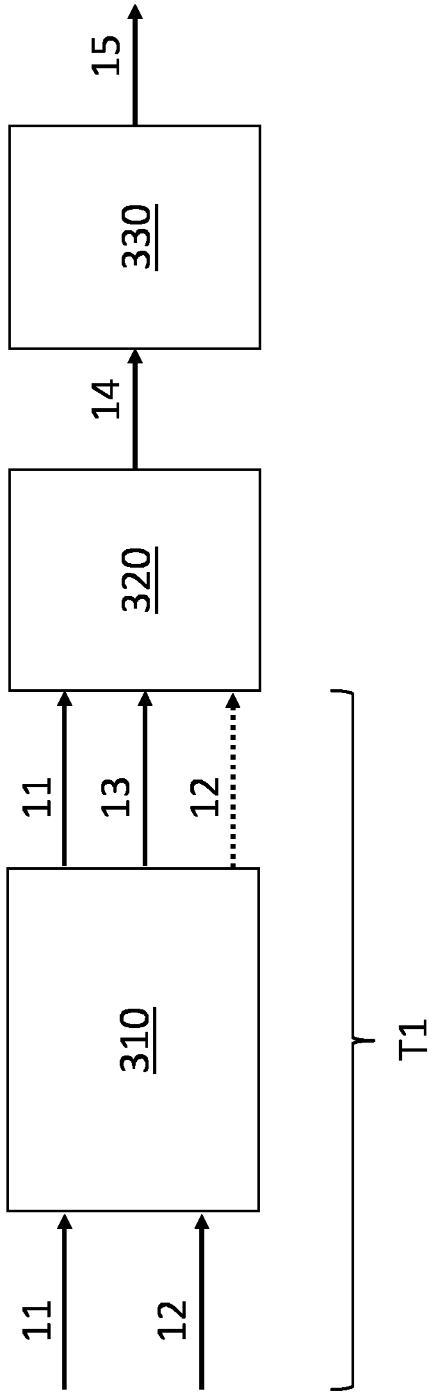
FIG. 3 schematically illustrates, with a simplified block diagram, an exemplary process according to embodiments of the invention.

FIG. 3 illustrates a schematic process flow comparable to the method illustrated with an example in FIG. 1. In the figure, a tube voltage 11 and a filament current 12 are input to an emission current model 310. The tube voltage 11 and the filament current 12 correspond to a time point T1 in a kVp switching cycle. By way of example, T1 may correspond to a time point for which a measurement of an emission current would be challenging or even impossible. Such as, but not limited to, during a rapid voltage transition from high to low or low to high peak voltage. The emission current model 310 calculates and outputs a calculated emission current 13 corresponding to the same time point T1. The emission current model 310 may apply a lookup table and/or may include other processing to generate an emission current 13 output based on input including the tube voltage 11 and the filament current 12. The model 310 may include a machine learning algorithm, such as e.g. a neural network. When machine learning is implemented in the emission current model 310, such a model may be trained with known sets of tube voltages and filament currents corresponding to known, such as measured or modeled, emission currents.

As shown in the example in FIG. 3, the calculated emission current 13 and the tube voltage 11, and optionally the filament current 12, are fed to a beam focusing calculator 320. Based on the input, including tube voltage 11 and emission current 13, the beam focusing calculator 320 may output a beam focusing current and/or voltage 14 suitable for the beam optics at time point T1. Finally, based on the calculated beam focusing current and/or voltage 14, a beam optics controller (330) generates and outputs an electron beam optics control signal 15.

Figure 4:
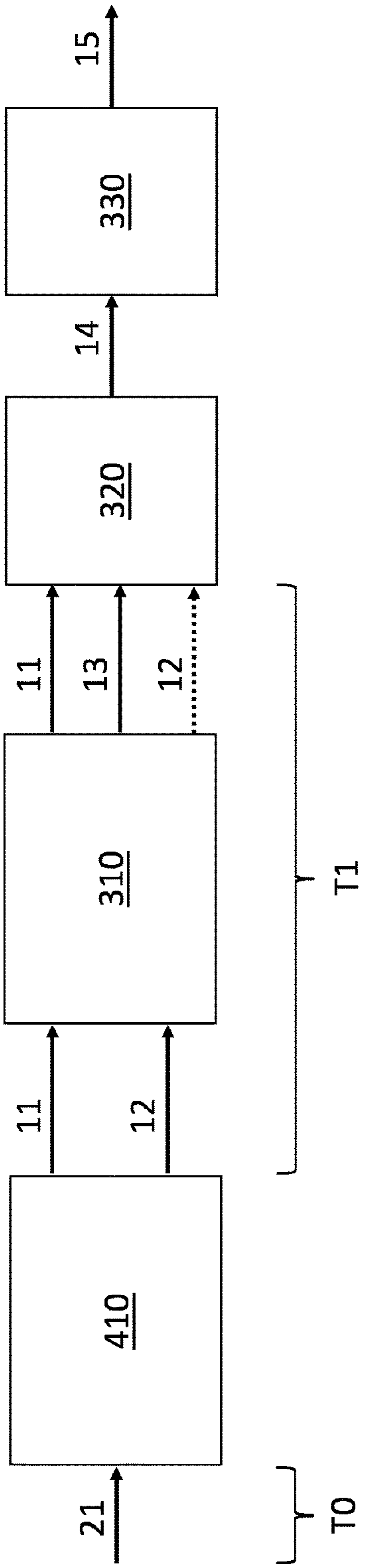
FIG. 4 schematically illustrates, with a simplified block diagram, another exemplary process according to embodiments of the invention.

It is noted that although the schematic block diagram in FIG. 3 and FIG. 4 illustrates the process with several separate blocks, the method according to embodiments of the invention may be carried out by a single or by multiple units. Such as, but not limited to, a single or distributed controller.

FIG. 4 illustrates a schematic process flow of a method including a predictive X-ray tube model 410, according to embodiments of the invention. From left to right in the Fig, the flow starts with inputting at least one X-ray tube characteristic 21 to the predictive X-ray tube model 410 at a time point T0. In other words, at an earlier time point compared to T1. As mentioned above, in relation to FIG. 2, examples of X-ray tube characteristics may include a tube emission current, a tube voltage, a tube filament current, a tube capacitance, a high voltage generator capacitance, a high voltage cable capacitance, a tube age, an anode age, a temperature, a rotor speed, and/or a tube acoustic signal. The characteristic may be measured, e.g. in real-time at T0, during a kVp switching cycle, or may be otherwise known at T0. The predictive model 410 generates as an output a predicted tube voltage 11 and/or filament current 12 at T1. The prediction of the tube voltage 11 and/or filament current 12 may include the use of a lookup table, such as but not limited to a 3-dimensional lookup table that maps emission currents to pairs of a tube voltage and a filament current. Alternatively or additionally, the predictive X-ray tube model 410 may be a physical model and/or a digital twin of the X-ray tube. Such an X-ray tube model may e.g. model the capacitances of the output side of the high voltage generator, the high voltage cable and/or the tube itself. The model 410 may allow to compute e.g. the tube voltage slope based on input such as the energy provided by the high voltage generator. The predictive X-ray tube model 410 may apply a machine learning algorithm, such as a neural network. The machine learning algorithm may be trained with training sets comprising known values of the tube characteristics and known, such as measured or modeled, tube voltages and/or filament currents.

As shown in FIG. 4, the predicted tube voltage 11 and/or filament current 12 at T1 is used as input to the emission current model 310, whereafter the process flow is comparable to that in FIG. 3. If one of tube voltage 11 and filament current 12 is not predicted for T1, that parameter may be measured or otherwise known and input to the emission current model 310. In an example, the predictive X-ray tube model 410 predicts a tube voltage waveform over time, such as at time points T1, T2, T3 etc. With the predicted tube voltage waveform and, calculated or measured, filament currents at the same time points used as input to the emission current model 310, a subsequent emission current waveform for time points T1, T2, T3 etc. may be calculated. In this way voltage waveforms and emission current waveforms, covering multiple time points of a kVp switching cycle, may be predicted by the modeling. In this way it may be possible to timely compute and control a focusing currents or voltage waveform that minimizes size and position deviations of the focal spot during kVp switching.

Figure 5:
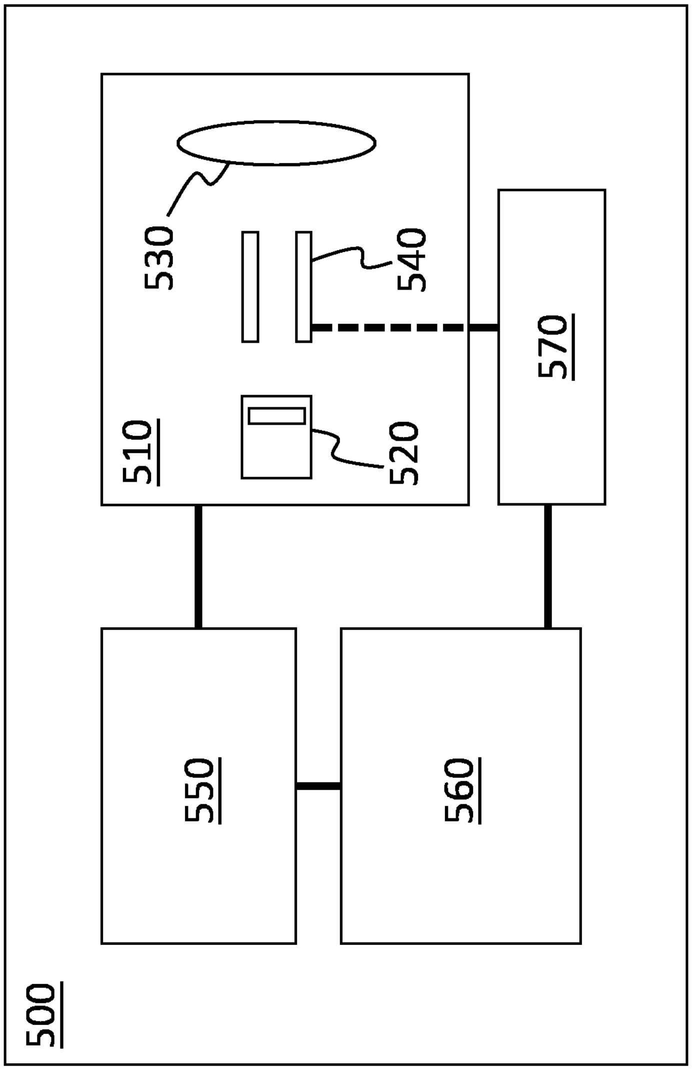
FIG. 5 schematically illustrates an X-ray system, according to embodiments of the invention.

FIG. 5 schematically illustrates an X-ray system 500 according to embodiments of the invention. The X-ray system 500 may be a computed tomography system or another system for spectral imaging with X-ray kVp switching. The system 500 includes an X-ray tube 510 comprising an anode 530 and a cathode 520 with a filament. A filament current may be applied to the filament, such that the filament is heated and expels electrons via thermionic emission. A tube voltage may be applied across the cathode 520 and the anode 530 and cause a beam of the electrons to accelerate from the cathode 520 and impinge the anode 530, thereby generating X-rays. The spectrum of X-rays depends on the peak tube voltage (kVp) applied between the cathode 520 and the anode 530. The X-ray tube 510 comprises electron beam optics 540 configured to control a focal spot size and/or focal spot position of an electron beam impacting the anode 530. The electron beam optics 540 may be electrostatic electron beam optics configured to control the focal spot size and/or position with at least one electrode and/or magnetic beam focusing optics configured to control the focal spot size and/or position with at least one magnetic focusing coil.

The X-ray system 500 includes a high voltage generator 550 configured to apply a kVp switching cycle of at least two different peak voltages between the anode 530 and the cathode 520. The high voltage generator 550 may also apply the filament current and may be configured to measure parameters such as tube voltage and/or filament current. The high voltage generator 550 may be configured to measure an emission current. Reliable measurement of the emission current may only be possible during certain conditions, such as during (part of) a steady state at a kVp voltage plateau. Measured tube voltage, filament current and/or emission current may be used to fine-tune and/or validate modeling of such parameters, such as for models in the methods described in FIGS. 1-4.

The X-ray system 500 comprises an X-ray source controller 560. The X-ray source controller may comprise or otherwise interact with a processor, such as but not limited to a computer, a computer network, and/or another programmable apparatus, such as a single and/or multi core processing unit, a graphics processing unit, an accelerated processing unit, a digital signal processor, a field programmable gate array, and/or an application-specific integrated circuit, etc. By way of example, the X-ray source controller 560 may fully or partly be integrated with the high voltage generator 550, or may be fully or partly integrated with the X-ray tube 510, or may be a separate unit, or may be fully or partly integrated with another part of the X-ray system 500. In an embodiment, the X-ray source controller 560 has inputs configured to receive a tube voltage 11 and a filament current 12 corresponding to a first time point of an X-ray tube kVp switching cycle; a processor for calculating, with an X-ray tube emission current model 310, a tube emission current 13 at the first time point, wherein the calculation is based on the tube voltage 11 and the tube filament current 12; the processor further being arranged for calculating an electron beam focusing current and/or focusing voltage 14 based on the calculated tube emission current 13 and the tube voltage 11; and the X-ray source controller 560 having an output for outputting an electron beam optics control signal 15 based on the calculated electron beam focusing current and/or focusing voltage 14. The X-ray source controller 560 may also be configured to receive one or multiple X-ray tube characteristics 21 at a second time point, wherein the second time point is earlier than the first time point; and predicting, with a predictive X-ray tube model 410 and based on the X-ray tube characteristics 21, the tube voltage 11 at the first time point and/or the tube filament current 12 at the first time point, wherein the predicted tube voltage 11 and/or filament current 12 form input to the X-ray tube emission current model 310. The X-ray source controller 560 may be comprised of one or multiple local and/or remote units.

The X-ray system further comprises a power supply 570. The power supply 570 is configured to receive the electron beam optics control signal 15 from the X-ray source controller 560 and apply the calculated electron beam focusing current and/or focusing voltage 14 to the electron beam optics 540 to control the focal spot size and/or focal spot position during kVp switching. The power supply 570 may be separate from or integrated with e.g. the high voltage generator 550. With the exemplified system it may be possible to timely control the electron beam optics during very rapid changes of the tube voltage and tube emission current. Such as e.g. during spectral CT with kVp switching.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word “comprising” does not exclude the presence of elements or steps other than those listed in a claim. The word “a” or “an” preceding an element does not exclude the presence of a plurality of such elements. The invention may be implemented by means of hardware comprising several distinct elements, and/or by means of a suitably programmed processor. In the device claim enumerating several means, several of these means may be embodied by one and the same item of hardware. Measures recited in mutually different dependent claims may advantageously be used in combination.

REFERENCE SIGNS

11 Tube voltage corresponding to first time point
12 Filament current corresponding to first time point
13 Calculated emission current at first time point
14 Focusing current and/or voltage
15 Electron beam optics control signal
21 X-ray tube characteristic
110 Receiving tube voltage and filament current
120 Calculating tube emission current
130 Calculating electron beam focusing
140 Outputting electron beam optics control signal
210 Receiving X-ray tube characteristic
220 Predicting tube voltage and/or filament current
310 Emission current model
320 Beam focusing calculator
330 Beam optics controller
410 Predictive X-ray tube model
500 X-ray system
510 X-ray tube
520 Cathode
530 Anode
540 Electron beam optics
550 High voltage generator
560 X-ray source controller
570 Power supply

The invention claimed is:

1. A computer-implemented method of controlling electron beam optics of an X-ray tube during X-ray kVp switching, the method comprising:

receiving a tube voltage and a filament current corresponding to a first time point of an X-ray tube kVp switching cycle;

calculating with an X-ray tube emission current model, a tube emission current at the first time point, wherein the calculation is based on the tube voltage and the tube filament current;

calculating an electron beam focusing current and/or focusing voltage based on the calculated tube emission current and the tube voltage; and outputting an electron beam optics control signal based on the calculated electron beam focusing current and/or focusing voltage.

2. The computer-implemented method according to claim 1, wherein the X-ray tube emission current model comprises a 3-dimensional lookup table that maps an emission current to a pair of a tube voltage and a filament current.

3. The computer-implemented method according to claim 1, wherein the electron beam optics control signal is synchronized with a tube voltage transition during the X-ray tube kVp switching cycle.

4. The computer-implemented method according to claim 1, wherein the method further comprises:

receiving at least one X-ray tube characteristic at a second time point, wherein the second time point is earlier than the first time point; and predicting, with a predictive X-ray tube model and based on the X-ray tube characteristic, the tube voltage at the first time point and/or the tube filament current at the first time point, wherein the predicted tube voltage and/or filament current form input to the X-ray tube emission current model.

5. The computer-implemented method according to claim 4, wherein the at least one X-ray tube characteristic comprises a tube emission current, a tube voltage, a tube filament current, a tube capacitance, a high voltage generator capacitance, a high voltage cable capacitance, a tube age, an anode age, a temperature, a rotor speed, and/or a tube acoustic signal.

6. The computer-implemented method according to claim 4, wherein at least one of the X-ray tube characteristics is measured during a kVp switching cycle.

7. The computer-implemented method according to claim 4, wherein the predictive X-ray tube model is a physical model and/or a digital twin of the X-ray tube.

8. The computer-implemented method according to claim 4, wherein the predictive X-ray tube model predicts a tube voltage waveform comprising the first time point.

9. The computer-implemented method according to claim 8, wherein a tube emission current waveform comprising the first time point is calculated with the emission current model.

10. An X-ray source controller for controlling electron beam optics of an X-ray tube, wherein the X-ray source controller is configured to carry out the computer-implemented method according to claim 1.

11. An X-ray system comprising:

an X-ray tube comprising an anode and a cathode;

electron beam optics configured to control a focal spot size and/or focal spot position of an electron beam impacting the anode of the X-ray tube;

a high voltage generator configured to apply a kVp switching cycle of at least two different voltages between the anode and the cathode of the X-ray tube;

the X-ray source controller as claimed in claim 10 and configured to output the electron beam optics control signal; and a power supply configured to receive the electron beam optics control signal from the X-ray source controller and apply the calculated electron beam focusing current and/or focusing voltage to the electron beam optics to control the focal spot size and/or focal spot position.

12. The system according to claim 11, wherein the electron beam optics comprises magnetic beam focusing optics configured to control the focal spot size and/or position with a magnetic focusing coil.

13. The system according to claim 11, wherein the system is a computed tomography system.

* * * * *